(12) United States Patent
Maiorano Quiroga et al.

(10) Patent No.: US 9,798,593 B1
(45) Date of Patent: Oct. 24, 2017

(54) SYNCHRONIZATION OF CODE EXECUTION

(71) Applicant: Workday, Inc., Pleasanton, CA (US)

(72) Inventors: Salvador Maiorano Quiroga, San Ramon, CA (US); Saul Arjona Polo, Caceres (ES); Andrew Jacob Malin, Oakland, CA (US); Daniel Duan Ho, Emeryville, CA (US)

(73) Assignee: Workday, Inc., Pleasanton, CA (US)

( * ) Notice: Subject to any disclaimer, the term of this patent is extended or adjusted under 35 U.S.C. 154(b) by 0 days.

(21) Appl. No.: 15/203,350

(22) Filed: Jul. 6, 2016

(51) Int. Cl.
*G06F 9/44* (2006.01)
*G06F 9/54* (2006.01)
*G06F 3/0484* (2013.01)

(52) U.S. Cl.
CPC .......... *G06F 9/542* (2013.01); *G06F 3/04847* (2013.01)

(58) Field of Classification Search
CPC ............................ G06F 8/65; H04L 29/08072
USPC .................................. 709/217, 219; 717/171
See application file for complete search history.

(56) References Cited

U.S. PATENT DOCUMENTS

| | | | | |
|---|---|---|---|---|
| 7,581,088 B1 * | 8/2009 | Metzgen | ............. | G06F 9/30094 |
| | | | | 712/234 |
| 8,533,685 B2 * | 9/2013 | Horley | ................ | G06F 9/30072 |
| | | | | 714/45 |
| 2015/0121041 A1 * | 4/2015 | Venkatachar | ....... | G06F 9/30098 |
| | | | | 712/217 |

* cited by examiner

*Primary Examiner* — Andy Ho
(74) *Attorney, Agent, or Firm* — Van Pelt, Yi & James LLP

(57) ABSTRACT

A system for determining a toggle value includes an input interface and a processor. The input interface is to receive a request for the toggle value associated with a toggle. The processor is to determine an indicated toggle value associated with the toggle; determine the toggle value associated with the toggle based at least in part on the indicated toggle value and a set of dependencies; and provide the toggle value associated with the toggle.

20 Claims, 11 Drawing Sheets

SYNCHRONIZATION OF CODE EXECUTION

BACKGROUND OF THE INVENTION

Upgrading software on a complex computer system can be a difficult process. Some computer systems comprise multiple server systems in communication with one another and require synchronization of code upgrades (e.g., each server system needs to transition from the old code version to the new code version at the same time). Some computer systems comprise multiple clients that need to be treated independently (e.g., some clients require the old code version and some clients require the new code version). Some computer systems comprise large code bases including a large number of code changes that may be in progress at any given time. This complexity creates a problem where it is difficult to keep track of which code version should be used for a particular execution.

BRIEF DESCRIPTION OF THE DRAWINGS

Various embodiments of the invention are disclosed in the following detailed description and the accompanying drawings.

DETAILED DESCRIPTION

Figure 1:
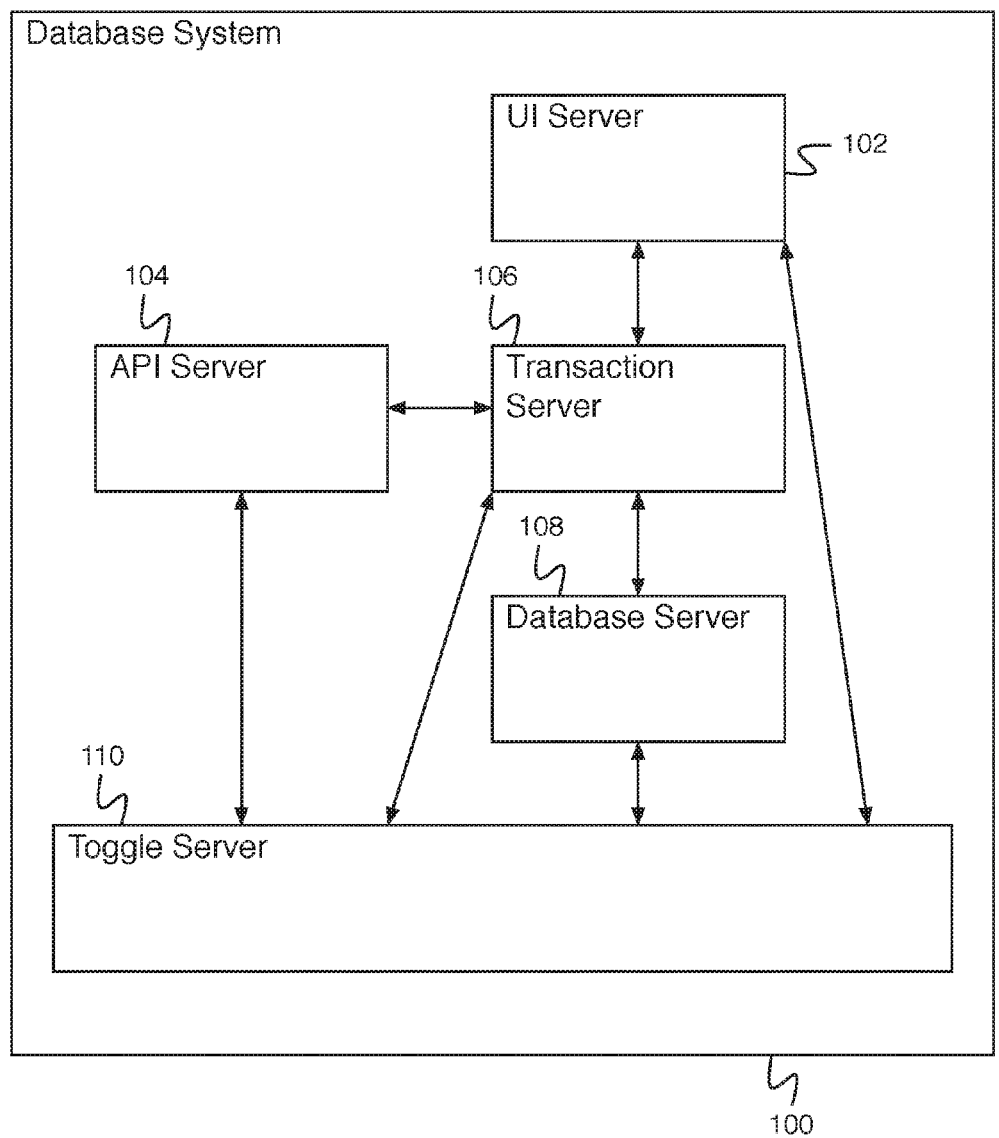
FIG. 1 is a block diagram illustrating an embodiment of a database system.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system for determining a toggle value comprises an input interface for receiving a request for the toggle value associated with a toggle, and a processor for determining an indicated toggle value associated with the toggle, determining the toggle value associated with the toggle based at least in part on the indicated toggle value and a set of dependencies, and providing the toggle value associated with the toggle. The system for determining a toggle value additionally comprises a memory coupled to the processor and configured to provide the processor with instructions.

In some embodiments, a system for synchronization of code execution comprises a system comprising a toggle server. In some embodiments, the system for synchronization of code execution comprises a database system comprising a set of servers including a toggle server. In various embodiments, the set of servers comprises a transaction server, a database server, an application programming interface (e.g., API) server, a user interface (e.g., UI) server, or any other appropriate servers. In some embodiments, modifications to the database system software comprise modifications to more than one server that need to be implemented simultaneously. For example, in the event that the data format used for communications between the UI server and the transaction server is updated, code on both the UI server and the transaction server needs to be modified. In some embodiments, the database system is utilized by multiple tenants (e.g., independent client customers), and it is desirable to use the updated software only for some of the tenants. The server systems thus need to be able to make a decision every time the updated software is run whether to run the updated version or the original version. The decision is made using a set of flags, referred to as toggles, centrally stored by the toggle server. In some embodiments, the set of flags is referred to as feature toggles. A toggle comprises an indication of whether or not a code segment should be run. An indication is provided to the toggle server of the toggle value (e.g., on or off) and the toggle server can be queried for the toggle value when the code segment is to be run. Any code segment can comprise an associated toggle for indicating whether it should be run. In some embodiments, the toggle comprises an associated tenant, allowing toggle settings for a code segment to vary by tenant. In some embodiments, a toggle comprises associated dependencies, wherein dependencies comprise other toggles that must be on in order for the toggle to be on. In the event a first toggle depends on a second toggle and the second toggle is off, the toggle server will report that the first toggle also is off, regardless of the actual toggle setting of the first toggle. In some embodiments, two code segments comprise dependencies on each other—for example, a first toggle for a code segment on the UI server comprises a dependency on a second toggle for a code segment on the transaction server, and the second toggle additionally comprises a dependency on the first toggle. When the toggle server is queried for the first toggle value or the second toggle value, the toggle server reports that either toggle is on only in the event that both toggles are set to on. In this way the transition between a first code version and a second code version using toggles is guaranteed to be synchronized between servers. In various embodiments, a toggle value determination has a complex dependency on different input values including an expression that is able to have functional dependencies between the values—for example, the functions AND, OR, XOR, or any other appropriate logical or mathematical functions.

FIG. 1 is a block diagram illustrating an embodiment of a database system. In some embodiments, database system 100 of FIG. 1 comprises a database system for providing database services to multiple clients. In some embodiments, clients contact database system 100 via UI server 102 (e.g., using a user interface provided by UI server 102). In some embodiments, automated communications are made to database system 100 via an application programming interface provided by API server 104. Database transactions indicated by clients are processed by transaction server 106 and database data is stored by database server 108. In some embodiments, multiple independent clients utilize database system 100 and have data stored in separate regions of database server 108. In the example shown, each of UI server 102, API server 104, transaction server 106, and database server 108 communicates with toggle server 110 to set toggle values and to query toggle values. In some embodiments, a code segment running on a server (e.g., UI server 102, API server 104, transaction server 106, or database server 108) is associated with a toggle stored on toggle server 110. A toggle setting for the toggle is indicated to and stored by toggle server 110. The toggle value is evaluated to determine whether the associated code segment should be run. When the code segment is to be run, the server it is to be run on queries the toggle server for a toggle value. In the event the toggle value is on, the server runs the code segment. In various embodiments, in the event the toggle value is off, the server runs an alternate code segment, the server skips the code segment, the server stops the currently running process, or the server performs any other appropriate alternate behavior. In some embodiments, each of UI server 102, API server 104, transaction server 106, database server 108, and toggle server 110 comprise an interface (e.g., for communicating with other server systems), a processor (e.g., for processing received and/or stored data and/or instructions), and a memory (e.g., for storing data and/or instructions).

Figure 2:
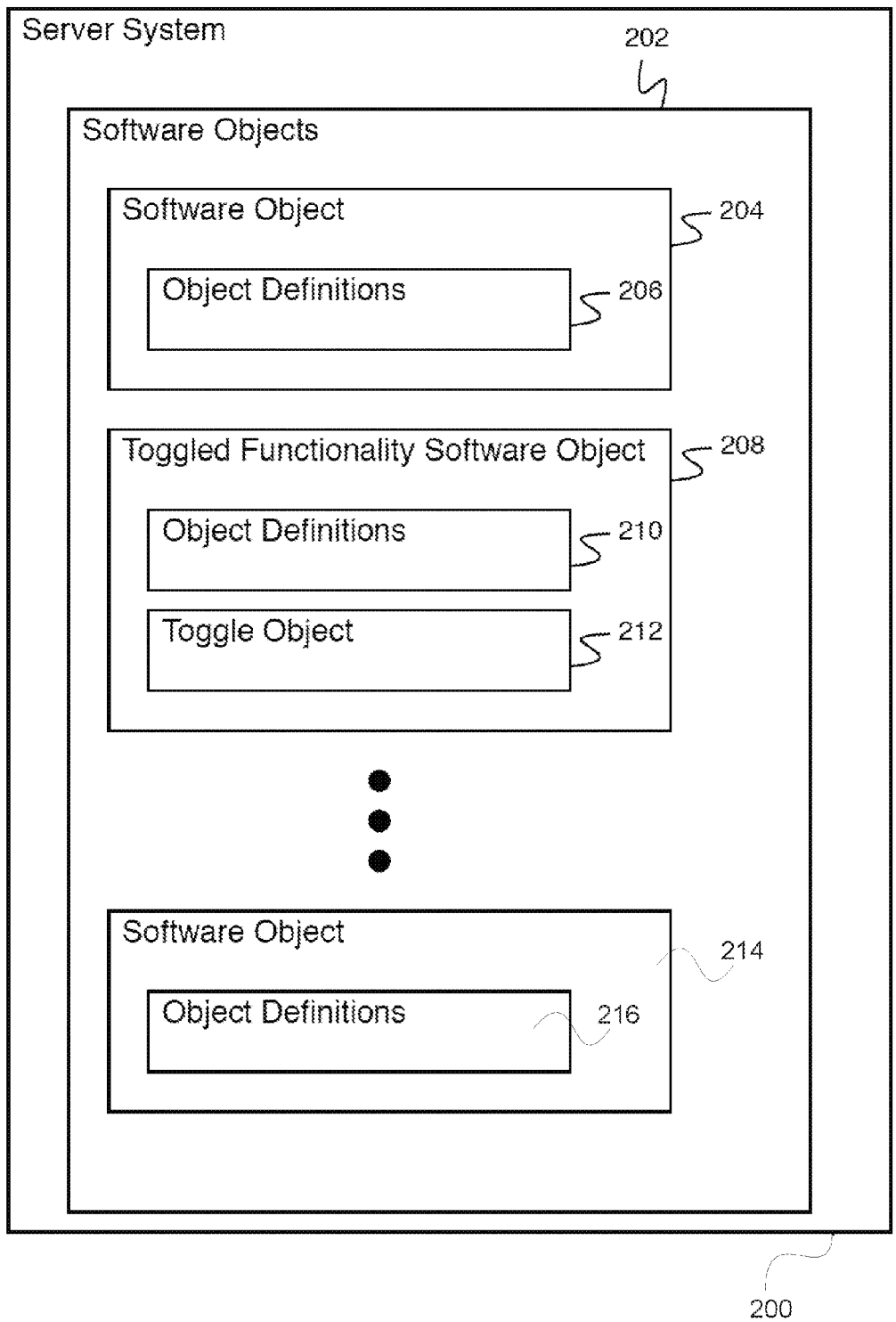
FIG. 2 comprises a block diagram illustrating an embodiment of software objects on a server system.

FIG. 2 comprises a block diagram illustrating an embodiment of software objects on a server system. In various embodiments, server system 200 comprises UI server 102 of FIG. 1, API server 104 of FIG. 1, transaction server 106 of FIG. 1, or database server 108 of FIG. 1. In some embodiments, software objects 202 comprise software objects for performing software tasks, stored on a memory and implemented by a processor and/or an interface. In the example shown, software objects 202 comprises a plurality of software objects (e.g., software object 204, software object 214, or toggled functionality software object 208), each comprising object definitions (e.g., object definitions 206, object definitions 210, or object definitions 216). In various embodiments, object definitions comprise variable definitions (e.g., definitions of stored data), function definitions (e.g., definitions of software functions), relation definitions (e.g., definitions of relationships to other software objects), or any other appropriate definitions. In some embodiments, software objects comprise objects for performing portions of the functionality of server system 200. Software objects 202 comprises one or more toggled functionality software objects (e.g., toggled functionality software object 208). In the example shown, toggled functionality software object 208 comprises object definitions 210 (e.g., comprising variable definitions, function definitions, relation definitions, etc.), and toggle object 212. Toggle object 212 comprises a toggle object associated with toggled functionality software object 208. In some embodiments, toggle object 212 is associated with toggled functionality software object 208 by a relation of object definition 210. In some embodiments, toggle object 212 comprises a sub-object of toggled functionality software object 208. In the example shown, object definition 210 comprises instructions for contacting toggle object 212 when software (for example, a function defined by a function definition of object definitions 210) is to be run. In some embodiments, toggle object 212 communicates with a toggle server to determine whether software is to be run. In some embodiments, toggle object 212 communicates with a toggle server to indicate whether software is to be run.

Figure 3:
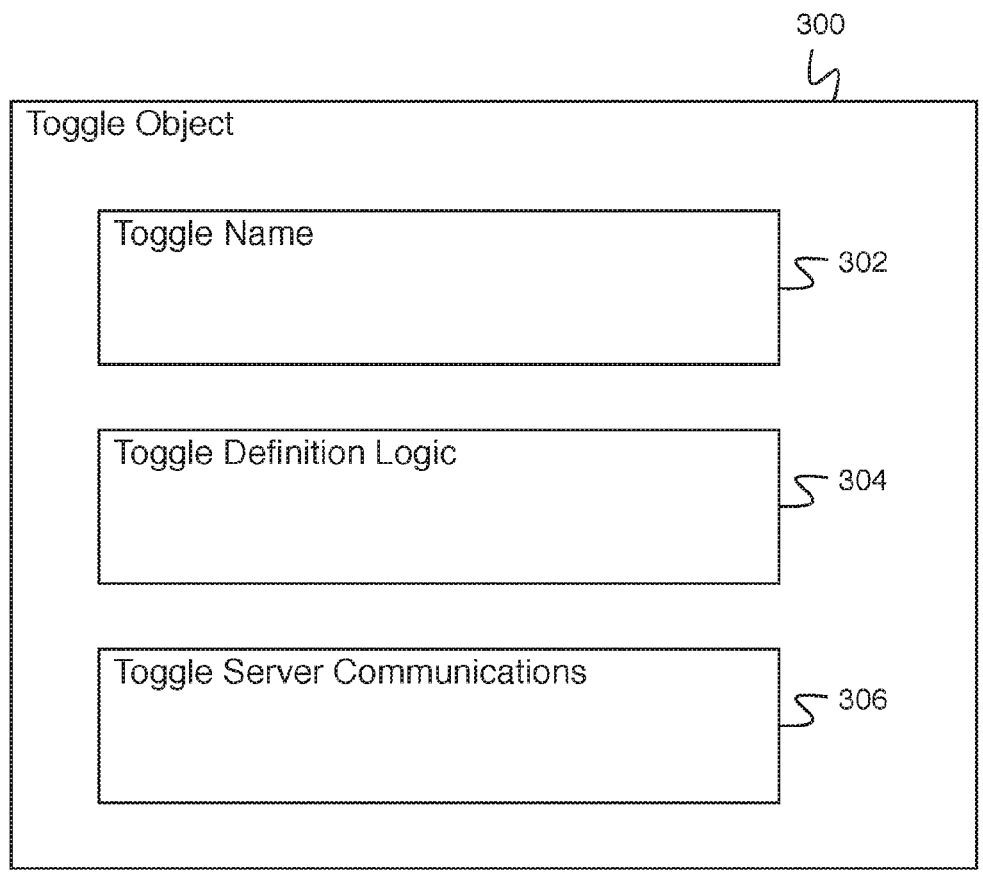
FIG. 3 is a block diagram illustrating an embodiment of a toggle object.

FIG. 3 is a block diagram illustrating an embodiment of a toggle object. In some embodiments, toggle object 300 comprises toggle object 212 of FIG. 2. In the example shown, toggle object 300 comprises toggle name 302. In some embodiments, toggle name 302 is used by toggle object 300 for identifying the toggle object to a toggle server. Toggle object 300 comprises toggle definition logic 304. In some embodiments, toggle definition logic 304 comprises logic for determining when to indicate the toggle object as being on or off to the toggle server. In various embodiments, toggle definition logic 304 comprises logic depending on information from other software objects of the same server (e.g., software objects 202), on information stored on other server systems, on information retrieved from the Internet, on input information, or on any other appropriate information. Toggle object 300 comprises toggle server communications 306. Toggle server communications 306 comprises information for communicating with a toggle server (e.g., a path or location associated with toggle server 110 of FIG. 1). Toggle object 300 communicates with the toggle server to indicate the value of the toggle (e.g., using toggle definition logic 304) and to query the value of the toggle (e.g., in the event associated software is to be executed).

Figure 4:
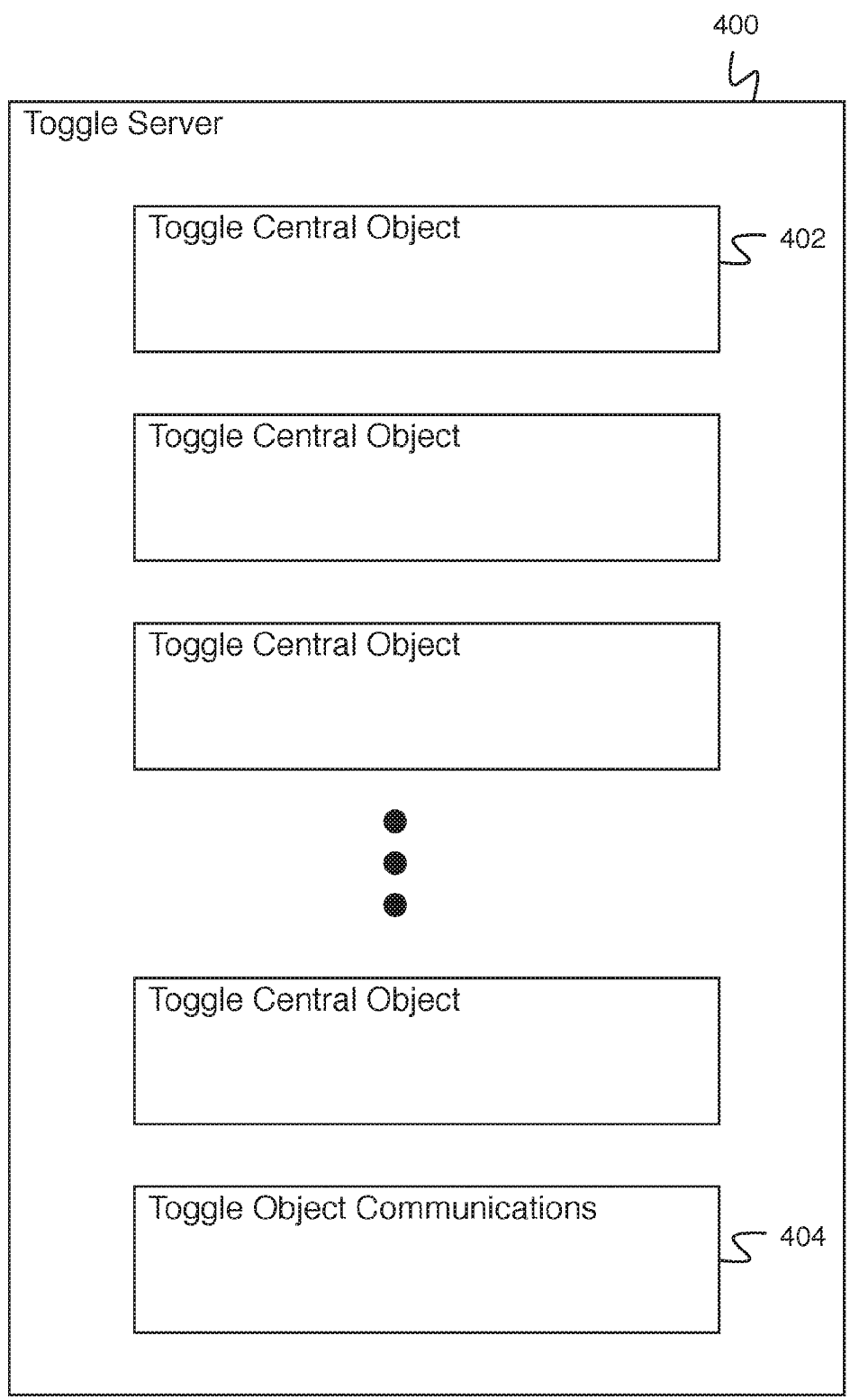
FIG. 4 is a block diagram illustrating an embodiment of a toggle server.

FIG. 4 is a block diagram illustrating an embodiment of a toggle server. In some embodiments, toggle server 400 comprises toggle server 110 of FIG. 1. In the example shown, toggle server 400 comprises a plurality of toggle central objects (e.g., toggle central object 402). Each toggle central object comprises a set of information describing a toggle (e.g., toggle name, toggle state, toggle dependencies, etc.). In some embodiments, each toggle central object is associated with a toggle object associated with a software object on a server system. Toggle server 400 comprises toggle object communications 404. Toggle object communications 404 comprises information for communicating with a toggle object (e.g., a path or location associated with toggle object 300 of FIG. 3). Toggle server 400 communicates with the toggle object to indicate the value of the toggle (e.g., in response to a query), to receive an indication of a toggle value, to receive an indication of a new toggle, or for any other appropriate purpose.

Figure 5:
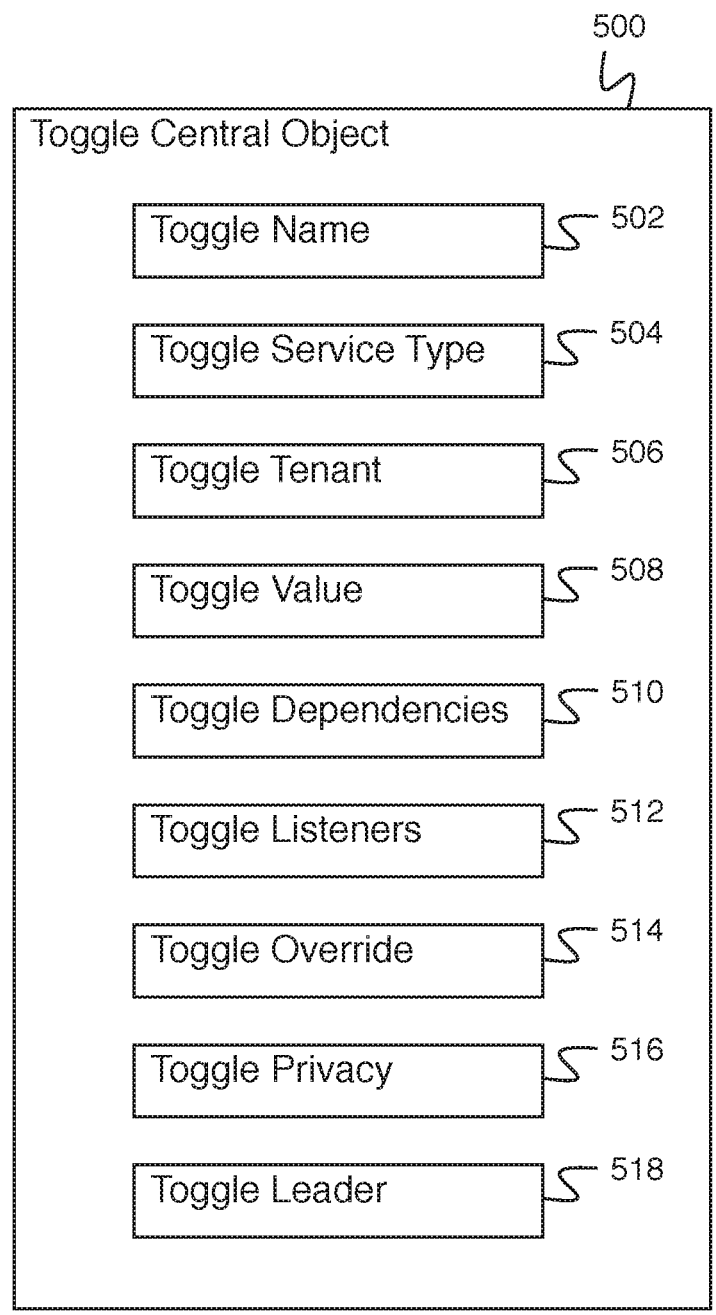
FIG. 5 is a block diagram illustrating an embodiment of a toggle central object.

FIG. 5 is a block diagram illustrating an embodiment of a toggle central object. In some embodiments, toggle central object 500 comprises a toggle central object of FIG. 4 (e.g., toggle central object 402). In the example shown, toggle central object 500 comprises a plurality of toggle information. Toggle name 502 comprises a toggle name for identifying the toggle. Toggle service type 504 comprises a service (e.g., a server system type—for example, a UI server, a transaction server, or a database server) the toggle is associated with. Toggle tenant comprises a tenant (e.g., a database system client) name that the toggle is associated with. Toggle value 508 comprises the value the toggle has most recently been indicated to be. Toggle dependencies 510 comprise names of other toggles that the toggle depends on (e.g., the toggle will not be reported as being on unless the toggle and all dependent toggles are also on). Toggle listeners 512 comprise references to listener objects associated with the toggle. In some embodiments, listener objects comprise objects on a server system associated with the toggle and configured to receive a toggle value for the toggle when the toggle value changes. In some embodiments, the toggle server provides a toggle value to the listener objects when the evaluated toggle value changes. Toggle override 514 comprises a value indicating the toggle has been overridden (e.g., a software object can indicate to the toggle server that a toggle should be immediately shut off or immediately turned on regardless of the current states of input values and logic associated with a toggle). Toggle privacy 516 comprises an indication of whether the toggle is publicly visible (e.g., whether the toggle is visible by other software or toggles). Toggle leader 518 comprises an indication of an object instance of the associated toggle object. In some embodiments, in the event there exist multiple object instances of the associated toggle object, one instance is determined to be the leader. The object instance that is the leader provides indications to the toggle server of indications to change the toggle value. All object instances query the toggle server for the toggle value when determining whether to run.

Figure 6:
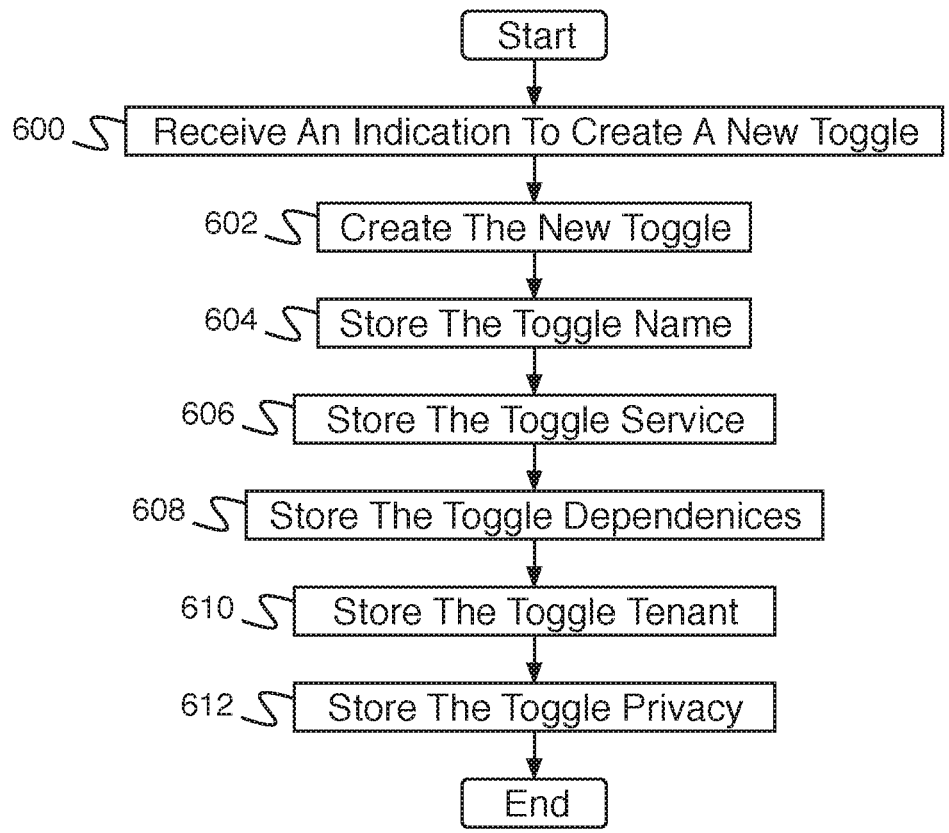
FIG. 6 is a flow diagram illustrating an embodiment of a process for creating a toggle.

FIG. 6 is a flow diagram illustrating an embodiment of a process for creating a toggle. In some embodiments, the process of FIG. 6 comprises a process for creating a toggle central object. In some embodiments, the process of FIG. 6 is executed by a toggle server (e.g., toggle server 110 of FIG. 1). In the example shown, in 600, an indication to create a new toggle is received. In some embodiments, the indication to create a new toggle is received from a toggle object (e.g., toggle object 212 of FIG. 2). In some embodiments, the indication comprises toggle information (e.g., toggle name, toggle dependencies, toggle tenant, toggle privacy, etc.). In 602, the new toggle is created. In 602, the toggle name is stored. In 606, the toggle service is stored. In some embodiments, the toggle service comprises an object associated with the toggle object. In 608, toggle dependencies are stored. In some embodiments, no toggle dependencies are stored. In 610, the associated toggle tenant. In some embodiments, no associated toggle tenant is stored. In 612, the toggle privacy (e.g., public or private) is stored.

Figure 7:
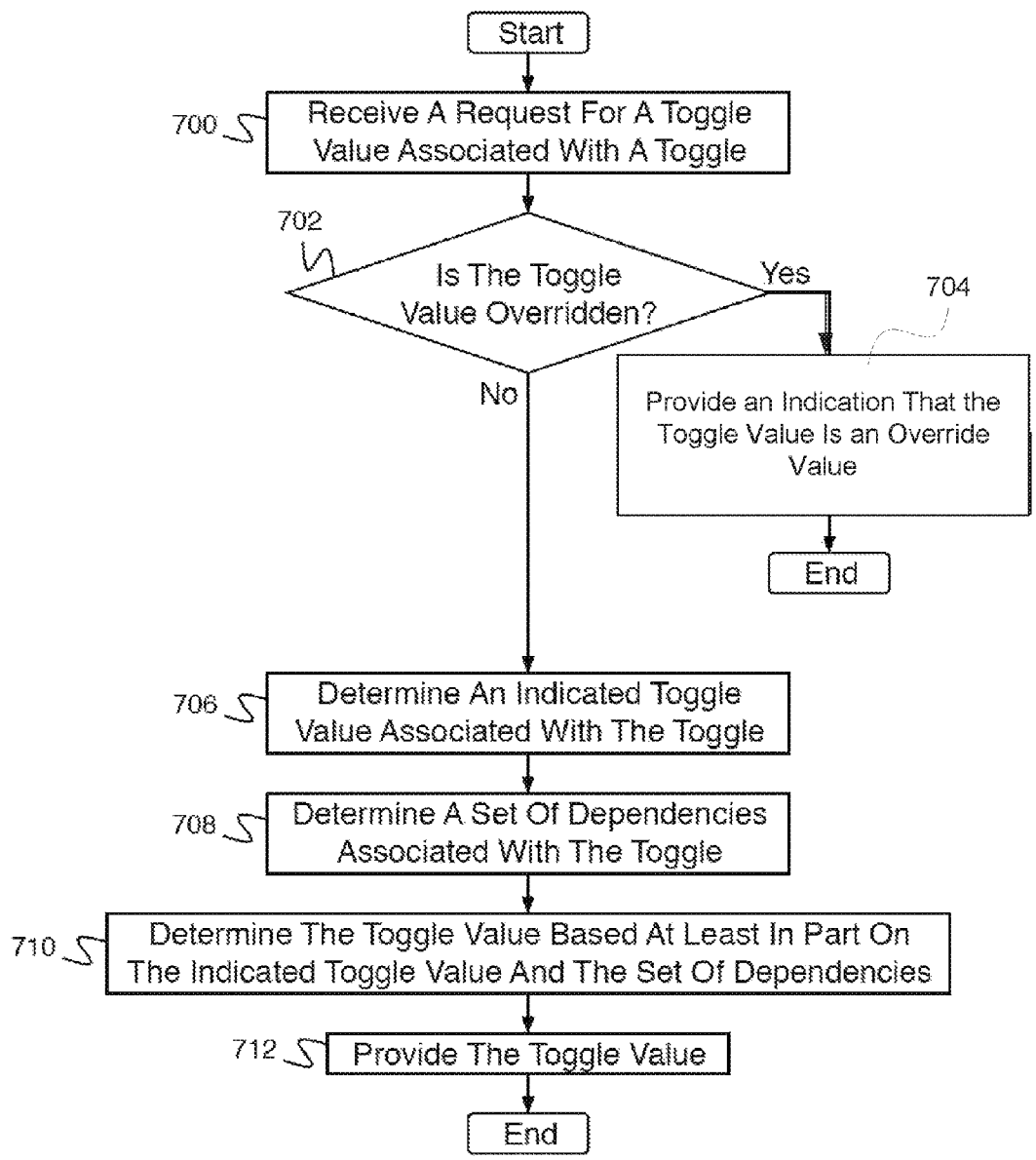
FIG. 7 is a flow diagram illustrating an embodiment of a process for responding to a toggle state query.

FIG. 7 is a flow diagram illustrating an embodiment of a process for responding to a toggle state query. In some embodiments, the process of FIG. 7 is executed by a toggle server (e.g., toggle server 110 of FIG. 1). In the example shown, in 700, a request for a toggle value associated with a toggle is received. In some embodiments, the toggle is identified using a toggle name. In 702, it is determined whether the toggle value is overridden. In some embodiments, determining whether the toggle value is overridden comprises querying a toggle override value associated with the toggle stored by the toggle server. In the event it is determined that the toggle value is not overridden, control passes to 706. In the event it is determined that the toggle value is overridden, control passes to 704. In 704, an indication is provided that the toggle value is an override value, and the process ends. For example, it is indicated that the toggle value is the override value of off or the override value of on. In 706, an indicated toggle value associated with the toggle is determined. In some embodiments, the indicated toggle value comprises the most recently received indication of the toggle value. In some embodiments, the indicated toggle value is stored by the toggle server. In some embodiments, in the event the indicated toggle value is determined to be off, the toggle value is determined to be off. In some embodiments, in the event the indicated toggle value is determined to be on, the toggle value is determined to be on. In 708, a set of dependencies associated with the toggle is determined. In some embodiments, the set of dependencies is stored by the toggle server. In 710, the toggle value is determined based at least in part on the indicated toggle value and the set of dependencies. In some embodiments, the toggle value is determined to be on only if the indicated toggle value and all toggles indicated by the set of dependencies are determined to be on. In some embodiments, the determined toggle value is determined based on the input toggle values that are part of a dependent set and a logic associated between the input toggle values to determine the determined toggle value. For example, input toggle values are in1=On, in2=On, in3=Off and the logic is defined as v=in1 AND in2 OR in3 or v=in1 AND in2 AND in3 or any other appropriate value function based on a set of input values. In 712, the toggle value is provided. In some embodiments, the toggle value is used by a system to allow the execution of a code section (e.g., allowing in the event that the toggle value is ON) or not allow or block the execution of a code section (e.g., blocking in the event that the toggle value is OFF).

Figure 8:
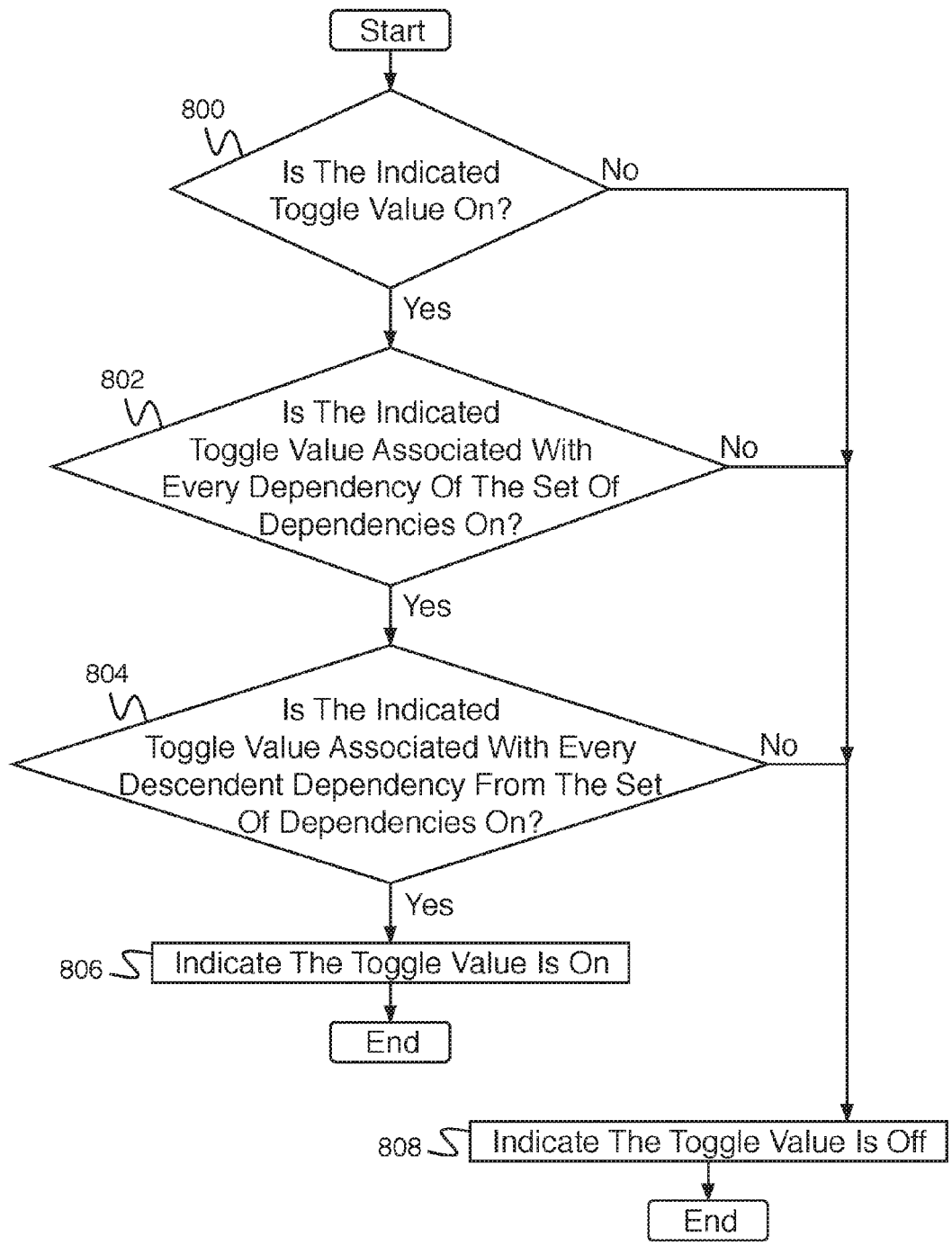
FIG. 8 is a flow diagram illustrating an embodiment of a process for determining a toggle value based at least in part on an indicated toggle value and on a set of dependencies.

FIG. 8 is a flow diagram illustrating an embodiment of a process for determining a toggle value based at least in part on an indicated toggle value and on a set of dependencies. In some embodiments, the process of FIG. 8 implements 710 of FIG. 7. In the example shown, in 800, it is determined whether the indicated toggle value is on (e.g., whether the toggle value has been set to on by software or by an administrator). In the event it is determined that the indicated toggle value is not on, control passes to 808. In the event it is determined that the toggle value is on, control passes to 802. In 802, it is determined whether the indicated toggle value associated with every dependency of the set of dependencies is on. In some embodiments, each dependency of the set of dependencies is associated with a toggle. In the event it is determined that the indicated toggle value associated with every dependency of the set of dependencies is not on, control passes to 808. In the event it is determined that the indicated toggle value associated with every dependency of the set of dependencies is on, control passes to 804. In 804, it is determined whether the indicated toggle value associated with every descendent dependency from the set of dependencies is on. In some embodiments, each dependency of the set of dependencies is associated with its own set of dependencies. In various embodiments, descendent dependencies comprise dependencies of dependencies, dependencies of dependencies of dependencies, dependencies of dependencies of dependencies of dependencies, etc. In some embodiments, it is typical that a first toggle depends on a second toggle and the second toggle depends on the first toggle, but the chain of dependencies does not extend further. In some embodiments, extended chains of dependencies are possible. In some embodiments, determining whether the indicated toggle value associated with every dependency of the set of dependencies is on and determining whether the indicated toggle value associated with every descendent dependency from the set of dependencies is on comprises determining a dependency value associated with the set of dependencies. In the example shown, in the event it is determined that the indicated toggle value associated with every descendent dependency from the set of dependencies is not on, control passes to 808. In the event it is determined that the indicated toggle value associated with every descendent dependency from the set of dependencies is on, control passes to 806. In 806, the process indicates that the toggle value is on, and the process ends. In 808, the process indicates that the toggle value is off.

In some embodiments, the toggle value is used by a system to allow the execution of a code section (e.g., allowing in the event that the toggle value is ON) or not allow or block the execution of a code section (e.g., blocking in the event that the toggle value is OFF).

Figure 9:
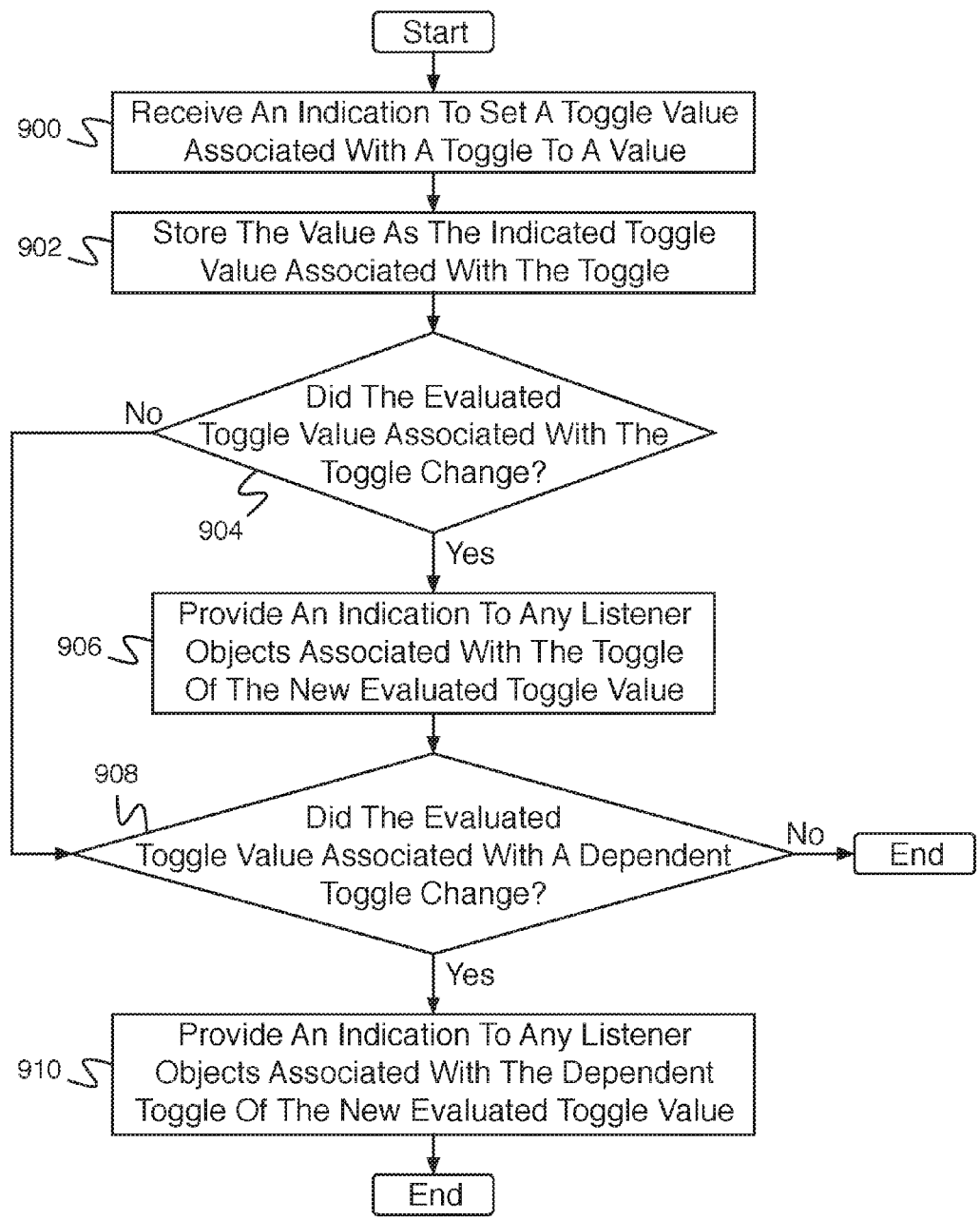
FIG. 9 is a flow diagram illustrating an embodiment of a process for setting an indicated value for a toggle.

FIG. 9 is a flow diagram illustrating an embodiment of a process for setting an indicated value for a toggle. In some embodiments, the process of FIG. 9 comprises a process for responding to an indication to set a toggle value. In some embodiments, the process of FIG. 9 is executed by a toggle server (e.g., toggle server 110 of FIG. 1). In the example shown, in 900, an indication to set a toggle value associated with a toggle to a value is received. In 902, the value is stored as the indicated toggle value associated with the toggle. In 904, it is determined whether the evaluated toggle value associated with the toggle changed. In some embodiments, the evaluated toggle value comprises the value determined by the process of FIG. 8. In some embodiments, the evaluated toggle value changes only when the indicated toggle value changes and all of the indicated toggle values associated with the associated toggle dependences are indicated to be on. In the event it is determined that the evaluated toggle value did not change, control passes to 908. In the event it is determined that the evaluated toggle value changed, control passes to 906. In 906, any listener objects associated with the toggle are provided an indication of the new evaluated toggle value. In 908, it is determined whether the evaluated toggle value associated with a dependent toggle has changed. In some embodiments, the evaluated toggle value is determined for each dependent toggle in order to determine if any have changed. In the event no evaluated toggle value associated with a dependent toggle has changed, the process ends. In the event an evaluated toggle value associated with a dependent toggle has changed, control passes to 910. In 910, an indication is provided to any listener objects associated with the dependent toggle (e.g., the dependent toggle with the evaluated value that has changed) of the new evaluated toggle value.

Figure 10:
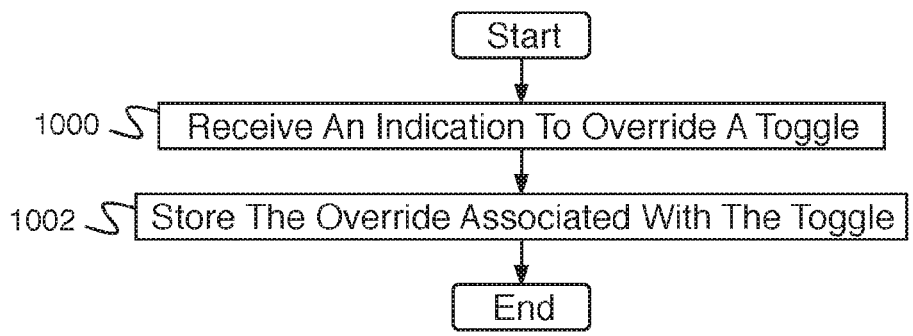
FIG. 10 is a flow diagram illustrating an embodiment of a process for overriding a toggle.

FIG. 10 is a flow diagram illustrating an embodiment of a process for overriding a toggle. In some embodiments, the process of FIG. 10 is executed by a toggle server (e.g., toggle server 110 of FIG. 1). In the example shown, in 1000, an indication to override a toggle is received. In various embodiments, the indication to override a toggle is received from a developer, from an administrator, from toggle override software, or from any other appropriate source. In some embodiments, a toggle override is used to cancel a function that is not behaving as desired. In 1002, the override is stored associated with the toggle (e.g., in a toggle override of a toggle central server).

Figure 11:
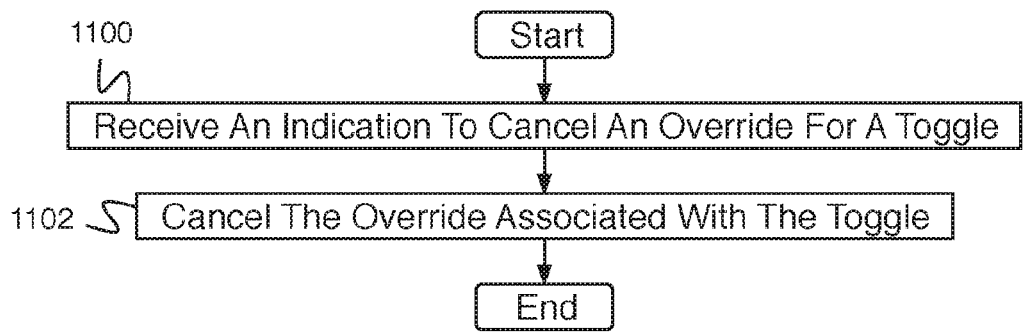
FIG. 11 is a flow diagram illustrating an embodiment of a process for overriding a toggle.

FIG. 11 is a flow diagram illustrating an embodiment of a process for overriding a toggle. In some embodiments, the process of FIG. 11 is executed by a toggle server (e.g., toggle server 110 of FIG. 1). In 1100, an indication to cancel an override for a toggle is received. In 1102, the override associated with the toggle is cancelled (e.g., in a toggle override of a toggle central server).

In some embodiments, the override is used by a system to allow the execution of a code section (e.g., allowing regardless of the value of a toggle) or not allow or block the execution of a code section (e.g., blocking regardless of a value for a toggle).

Figure 12:
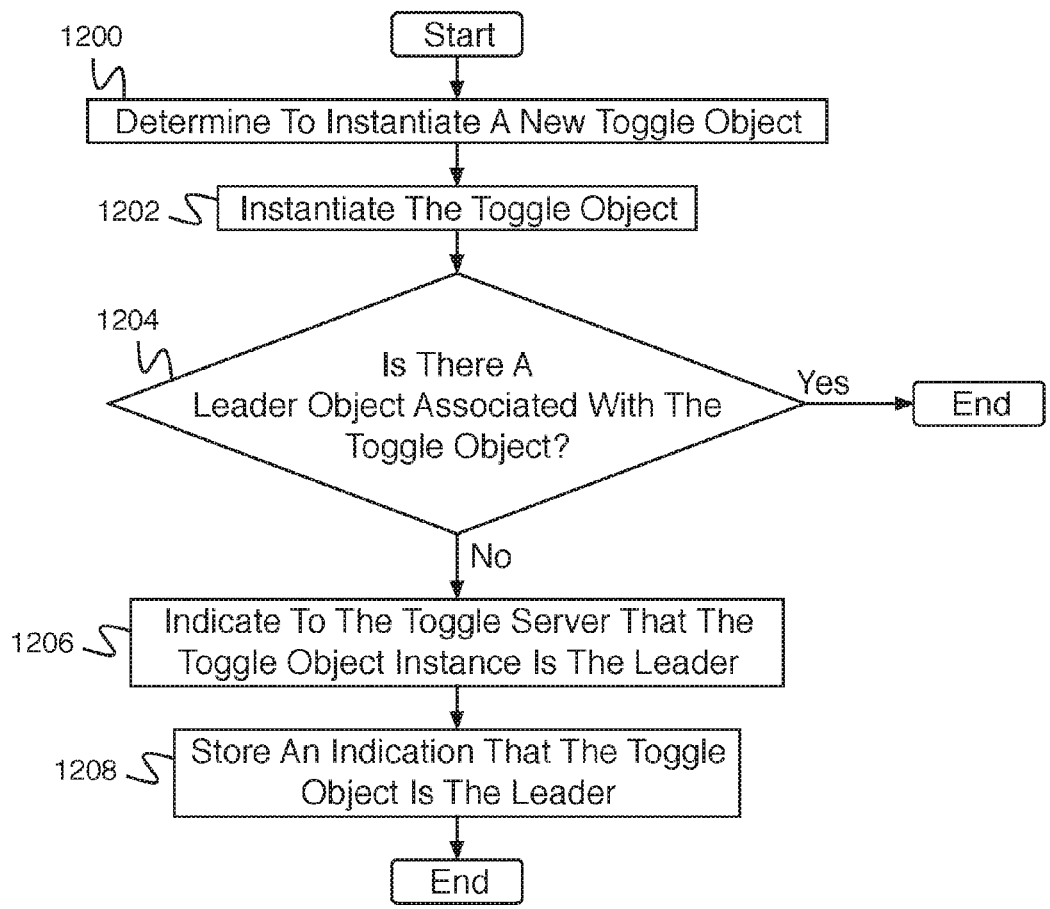
FIG. 12 is a flow diagram illustrating an embodiment of a process for determining a leader status.

FIG. 12 is a flow diagram illustrating an embodiment of a process for determining a leader status. In some embodiments, the process of FIG. 12 is executed by a server system (e.g., server system 200 of FIG. 2). In the example shown, in 1200, it is determined to instantiate a new toggle object. In some embodiments, determining to instantiate a new toggle object comprises determining to instantiate a new toggled functionality software object. In 1202, the toggle object is instantiated. In 1204 it is determined whether there is a leader object associated with the toggle object. In some embodiments, determining whether there is a leader object associated with the toggle object comprises querying a toggle server. In the event it is determined that there is a leader object, the process ends. In the event it is determined that there is not a leader object, control passes to 1206. In 1206, it is indicated to the toggle server that the toggle object instance is the leader. In 1208, an indication is stored that the toggle object is the leader.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for determining a toggle value, comprising:
   an input interface to:
      receive a request for the toggle value associated with a toggle; and
   a processor to:
      determine an indicated toggle value associated with the toggle;
      determine the toggle value associated with the toggle based at least in part on the indicated toggle value and a set of dependencies; and
      provide the toggle value associated with the toggle.

2. The system of claim 1, wherein the processor is further to:
   in the event that the indicated toggle value associated with the toggle is off, determine that the toggle value associated with the toggle is off.

3. The system of claim 1, wherein the processor is further to determine a dependency value associated with the set of dependencies.

4. The system of claim 3, wherein the dependency value is on in the event that a toggle value associated with each dependency of the set of dependencies is on and a toggle value associated with all descendent dependencies from the set of dependencies is on.

5. The system of claim 3, wherein the toggle value is determined to be on in the event that the indicated value associated with the toggle is determined to be on and the dependency value associated with the set of dependencies is determined to be on.

6. The system of claim 1, wherein the processor is further to:
in the event that an override value associated with the toggle is on, determine the toggle value associated with the toggle is off.

7. The system of claim 1, wherein the processor is further to:
receive an indication to set the toggle value associated with the toggle to a value; and
store the value as the indicated toggle value associated with the toggle.

8. The system of claim 7, wherein the processor is further to:
determine whether an evaluated toggle value associated with the toggle has changed; and
in the event it is determined that the evaluated toggle value associated with the toggle has changed:
provide an indication to any listener objects associated with the toggle of a new evaluated toggle value.

9. The system of claim 7, wherein the processor is further to:
determine whether an evaluated toggle value associated with a dependent toggle has changed; and
in the event it is determined that the evaluated toggle value associated with the dependent toggle has changed:
provide an indication to any listener objects associated with the dependent toggle of a new evaluated toggle value.

10. The system of claim 1, wherein the processor is further to create a new toggle.

11. The system of claim 1, wherein the toggle is associated with a tenant of a set of tenants.

12. The system of claim 1, wherein the request for the toggle value is associated with a tenant of a set of tenants.

13. The system of claim 1, wherein the toggle is associated with a privacy setting.

14. The system of claim 1, wherein the toggle is associated with a set of listeners.

15. The system of claim 1, wherein the processor is further to:
receive an indication to override the toggle; and
store the override associated with the toggle.

16. The system of claim 1, wherein the processor is further to:
receive an indication to cancel an override for the toggle; and
cancel the override associated with the toggle.

17. The system of claim 1, wherein the processor is further to:
receive an indication that a toggle object instance is an indication of a leader object instance associated with the toggle; and
store the indication of the leader object instance associated with the toggle.

18. The system of claim 1, wherein the processor is further to determine the set of dependencies associated with the toggle.

19. A method for determining a toggle value, comprising:
receiving a request for the toggle value associated with a toggle;
determining, using a processor, an indicated toggle value associated with the toggle;
determining the toggle value associated with the toggle based at least in part on the indicated toggle value and a set of dependencies; and
providing the toggle value associated with the toggle.

20. A computer program product for determining a toggle value, the computer program product being embodied in a non-transitory computer readable storage medium and comprising computer instructions, that when executed by a processor, cause the processor to perform steps comprising:
receiving a request for the toggle value associated with a toggle;
determining an indicated toggle value associated with the toggle;
determining the toggle value associated with the toggle based at least in part on the indicated toggle value and a set of dependencies; and
providing the toggle value associated with the toggle.

* * * * *